(12) United States Patent
Tene et al.

(10) Patent No.: US 7,987,473 B1
(45) Date of Patent: Jul. 26, 2011

(54) ACCELERATED CLASS CHECK

(75) Inventors: Gil Tene, Los Altos Hills, CA (US); Murali Sundaresan, Sunnyvale, CA (US); Michael A. Wolf, San Francisco, CA (US)

(73) Assignee: Azul Systems, Inc., Sunnyvale, CA (US)

( * ) Notice: Subject to any disclaimer, the term of this patent is extended or adjusted under 35 U.S.C. 154(b) by 1189 days.

(21) Appl. No.: 11/227,419

(22) Filed: Sep. 14, 2005

Related U.S. Application Data

(60) Provisional application No. 60/610,028, filed on Sep. 14, 2004.

(51) Int. Cl.
*G06F 9/42* (2006.01)

(52) U.S. Cl. ........ 719/320; 719/331; 719/332; 717/116; 717/148; 717/153

(58) Field of Classification Search .................... 719/320
See application file for complete search history.

(56) References Cited

U.S. PATENT DOCUMENTS

| | | | | |
|---|---|---|---|---|
| 5,291,593 A * | 3/1994 | Abraham et al. | ......... | 707/103 R |
| 6,161,217 A * | 12/2000 | Detlefs et al. | ................. | 717/141 |
| 6,401,137 B1 * | 6/2002 | Wolczko et al. | ............... | 719/315 |
| 6,785,687 B2 * | 8/2004 | Baskins et al. | ......................... | 1/1 |
| 6,948,156 B2 * | 9/2005 | Sokolov | ........................ | 717/136 |
| 2002/0194191 A1 * | 12/2002 | Sexton et al. | ................. | 707/102 |
| 2003/0177152 A1 * | 9/2003 | Darnell | ........................ | 707/206 |
| 2005/0155044 A1 * | 7/2005 | Broussard et al. | ............. | 719/330 |
| 2005/0198045 A1 * | 9/2005 | Wu et al. | ....................... | 707/100 |

* cited by examiner

*Primary Examiner* — Hyung S Sough
*Assistant Examiner* — Syed Roni
(74) *Attorney, Agent, or Firm* — Van Pelt, Yi & James LLP

(57) ABSTRACT

Determining a class of an object is disclosed. A pointer of the object is obtained. One or more bits that are not implemented as address bits are extracted from the pointer. The one or more bits are interpreted as an identifier of the class of the object. The class of the object is determined to correspond to the identifier.

26 Claims, 5 Drawing Sheets

CID Table

| CID | Class Address |
|-----|---------------|
| ⋮ | ⋮ |

ACCELERATED CLASS CHECK

CROSS REFERENCE TO OTHER APPLICATIONS

This application claims priority to U.S. Provisional Patent Application No. 60/610,028 entitled VIRTUAL MACHINE filed Sep. 14, 2004, which is incorporated herein by reference for all purposes.

BACKGROUND OF THE INVENTION

In object oriented programming languages, determining information about a class of an object from an object pointer can consume a large amount of performance resources. FIG. 1 is a block diagram illustrating a relationship between an object pointer, an object, and a class structure. Object pointer 102 includes a virtual memory address of object 104. Object 104 contains information associated with the object and includes a pointer to class structure 106 associated with the class of object 104. For each class in a program, there exists only one class structure. Objects belonging to the same class contain the same pointer to the same class structure. Class structure 106 includes information associated with an object class. Given a pointer of an object, it is often desired to determine if the class of the object associated with the pointer belongs to a known class. Since class structure pointers refer to the only class structure of a class, the value of a class structure pointer can be used as an identifier to compare object classes. An object is stored in memory using the given object pointer, and the class structure pointer is obtained from the object. The obtained class structure pointer is compared with a known class structure pointer value to determine if the class of the object associated with the given object pointer is same as the class associated with the known class object pointer value. This comparison process can consume a large amount of performance resources. Loading the object using the given object pointer usually produces a cold cache miss, causing misses in every cache level. A large number of clocks cycles are wasted as the object is brought into the cache from main memory. Since class comparisons are very common operations in object oriented language programs, it is desirable to speed up class comparison operations. Therefore, there exists a need for a more efficient way to obtain data associated with a class of an object.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network Wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose-of example and the invention may be practiced according to the claims without some or all of these specific details. For the purpose of clarity, technical material that is known in the technical fields related to the invention has not been described in detail so that the invention is not unnecessarily obscured.

Determining the class of an object is disclosed. In some embodiments, a class identifier is stored in one or more object pointer bits not implemented an address bit. The class of the object can be determined without accessing the object associated with the object pointer by using the class identifier bits in the object pointer. In some embodiments, a table associates the class identifier in the header with data associated with the class structure.

Figure 1:
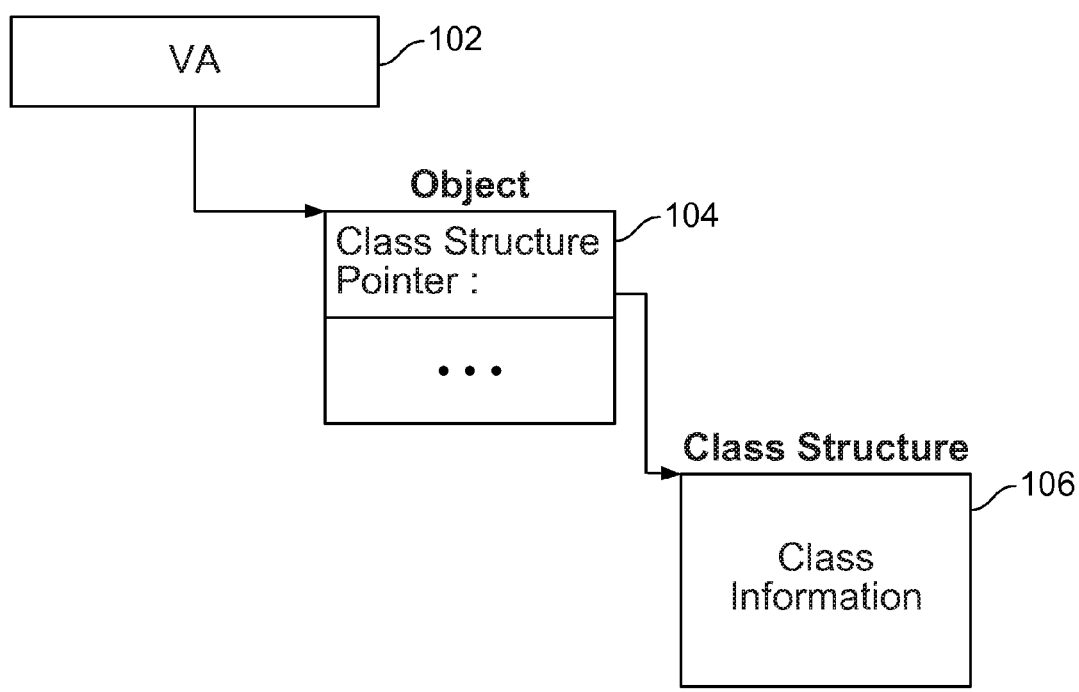
FIG. 1 is a block diagram illustrating a relationship between an object pointer, an object, and a class structure.
Figures 2, 3:
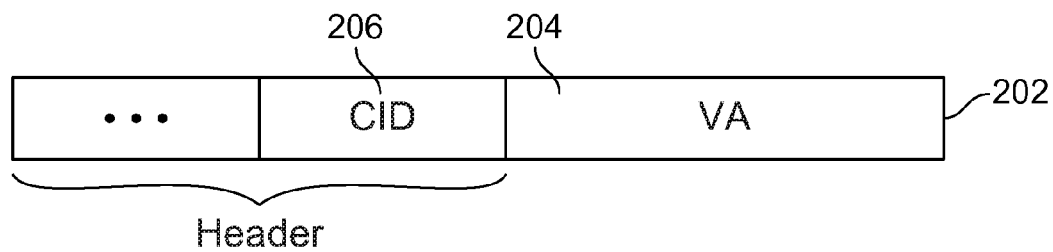
FIG. 2 is a diagram illustrating an embodiment of an object pointer.
FIG. 3 is a diagram illustrating an embodiment of a table including one or more class identifiers.

FIG. 2 is a diagram illustrating an embodiment of an object pointer. Box 202 represents an object pointer. The object pointer may include any number of bits. Often the number of bits of an object pointer is larger than the number of bits required to represent the total amount of physical memory addressable on a system. For example a 64 bit object pointer can address 16 billion gigabytes of data. At least some bits of the object pointer can be used as header bits (bits not implemented as address bits). Object pointer 202 includes virtual address bits 204 that refer to an object associated with virtual address 204. The numbers of bits used to contain the virtual address may be preconfigured or dynamically configured. In some embodiments, the numbers of bits used to contain the virtual address is associated with the maximum amount of memory that can physically exist on a system. At least a portion of the header of object pointer 202 includes class identifier (CID) bits 206. The header may include other data. Class identifier 206 is associated with at least one class structure pointer. The number of bits comprising class identifier 206 may be preconfigured or configured dynamically. In some embodiments, the number of bits comprising class identifier 206 is less than the number of bits comprising a call information object pointer. In some embodiments, the number of classes in a program is less than or equal to the number of classes representable by the number of bits used to contain class identifier 206. Each class in the program may be associated with a unique class identifier. In some embodiments, a class identifier is associated with more than one class in a program. For example if the number of classes in a program is greater than the number of classes representable by the number of bits used to contain class identifier 206, a single class identifier may be associated with more than one class. To identify these classes associated with the single class identifier, the object associated with virtual address 204 may be loaded to obtain the class structure pointer.

FIG. 3 is a diagram illustrating an embodiment of a table including one or more class identifiers. The table may contain data associated with the class identifier. Data contained the table may be located using a class identifier. The class identifiers may be CID 206 of FIG. 2. The table may include table entries each associated with a different possible valid CID value, where all valid CID values are associated in the table. For example, each valid CID value associated with a class in a program may be stored as an entry in the table. The one or more class identifiers in a table entry may be associated with a class structure pointer in the table entry. For example, a table entry includes a CID and a class structure pointer both associated with the same class. In some embodiments if a CID is associated with more than one class, the CID is associated with a table entry indicating more than one class is associated with the CID. By storing and associating a CID with a class structure pointer, the class structure pointer may be accessed by using the CID to obtain the class structure pointer from the table rather than loading an object using a virtual address to obtain the class structure pointer. The aggregation of CIDs and associated class data in a table can improve data locality in programs where the associated class data is accessed frequently. In some embodiments, at least a portion of information in a class structure is stored in a table entry associated with a class identifier. In some embodiments, a virtual method table and a class identifier, both associated with the same class, are included together in a table entry. In some embodiments, a pointer to a virtual method table and a class identifier, both associated with the same class, are included together in a table entry. The virtual method table may be used to invoke methods associated with the class. For example, a desired class method may be invoked by using a CID in the object pointer to locate an entry in the class identifier table containing a class method table associated with the class of the object pointer and invoking the desired method in the method table. In some embodiments, the virtual method table includes a start address of each method defined in a class or inherited from a superclass.

Figure 4:
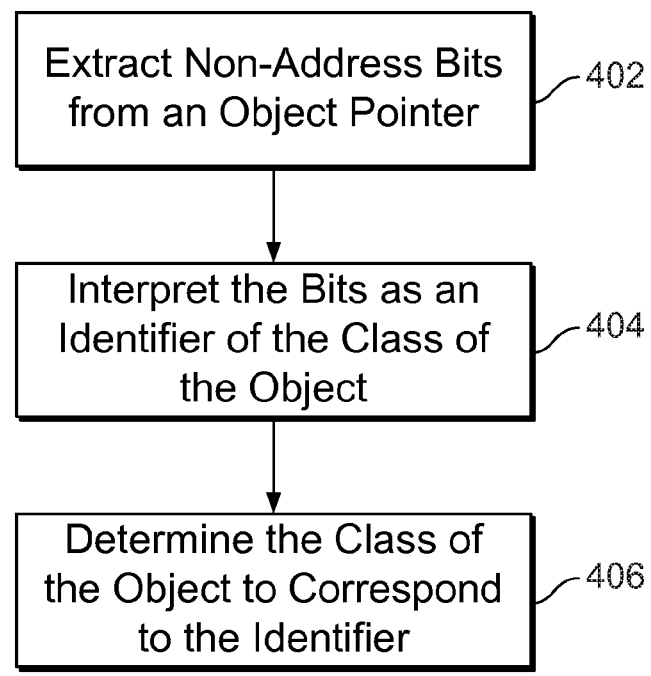
FIG. 4 is a flow chart illustrating an embodiment of a process for determining a class of an object.

FIG. 4 is a flow chart illustrating an embodiment of a process for determining a class of an object. At 402, one or more non-address bits are extracted from an object pointer. Non-address bits may be CID 206 of FIG. 2. The object pointer may be object pointer 202 of FIG. 2. Extracting the bits may include obtaining a subset of bits from the object pointer. For example, a mask, a bit wise operation, or a shifting operation is used to obtain one or more header bits of the object pointer. At 404, the extracted bits are interpreted as an identifier of the class of the object associated with the object pointer. Interpreting the extracted bits as an identifier of the class of the object may include performing processing required to use the bits as an identifier associated with the object pointer. The processing may include loading the extracted bits into an immediate field of a processor instruction or loading the bits into a register. At 406, the class of the object associated with the object pointer is determined to correspond to the extracted identifier. In some embodiments, determining the class of the object to correspond to the identifier includes validating the extracted bits as a valid identifier. In other embodiments, determining the class of the object to correspond to the identifier includes comparing the extracted bits with a known value. The known value may be a class identifier value associated with a desired class to be used in the comparison.

Figure 5:
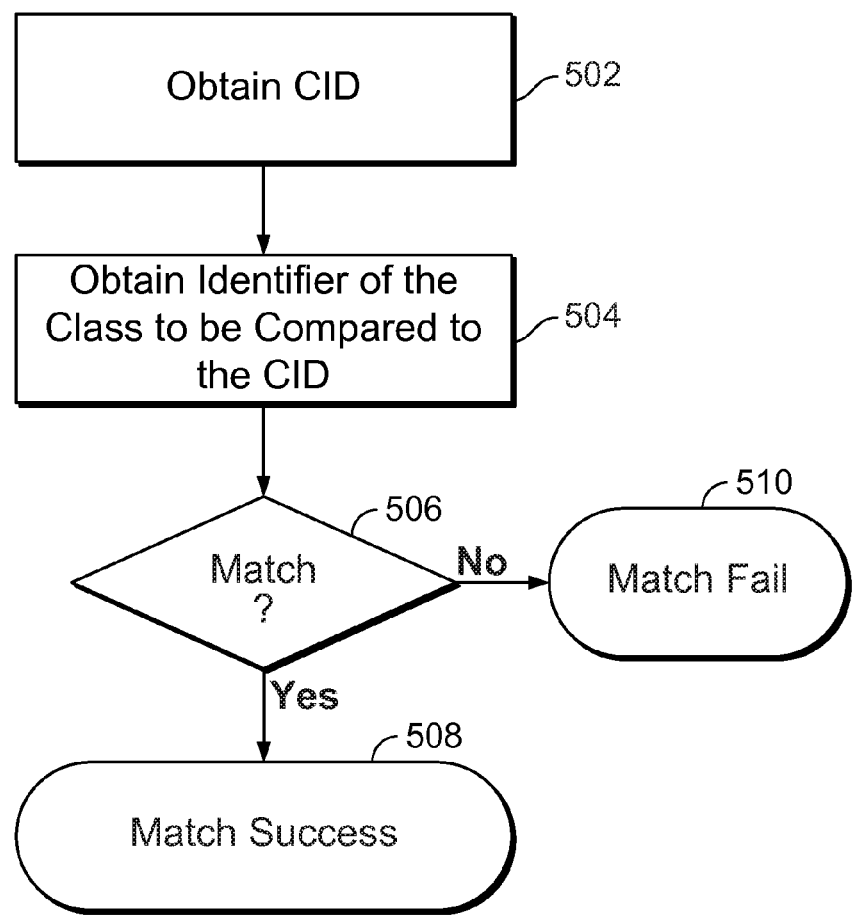
FIG. 5 is a flow chart illustrating an embodiment of a process for performing a comparison associated with a class identifier of an object pointer.

FIG. 5 is a flow chart illustrating an embodiment of a process for performing a comparison associated with a class identifier of an object pointer. In some embodiments, the process of FIG. 5 is included in 406 of FIG. 4. At 502, a CID of the object pointer is obtained. Obtaining the CID may include reading and/or loading the CID value to/from a register or an immediate field of an instruction. In some embodiments, obtaining the CID includes extracting CID bits from the object pointer. At 504, a comparison identifier of the class to be compared to the CID is obtained. The comparison identifier may be a preconfigured or dynamically determined class identifier value. In some embodiments the comparison identifier may be a class identifier value of the currently executing program object. Obtaining the comparison identifier may include reading and/or loading the identifier value to/from a register or an immediate field of an instruction. At 506, the obtained CID value and the obtained comparison identifier are compared. If at 506 it is determined the values match, match success is reached at 508. A successful match may indicate an object associated with the obtained CID belongs to the same class as the class associated with the comparison identifier. If at 506 it is determined that the values do not match, match fail is reached at 510. In some embodiments, match fail results in a comparison of the obtained CID with another comparison identifier or the class structure pointer (associated with the object pointer of the obtained CID) is obtained to determine a class associated with the object pointer. In some embodiments, the match fail is associated with a hardware trap. The hardware trap may be associated with a software fixup.

Some object oriented programming languages support virtual method calls. For a same method call site, different code can be executed depending upon the class of the object associated with the virtual call. The target method of virtual calls can only be determined at run-time based at least in part on the class of the object associated with the call. Traditionally, performing the virtual call requires sequence of loads followed by an indirect register jump (indirect jumps often take longer to perform compared to direct jump used in static method calls) to a section of code associated with the virtual call. For example, handling a virtual call includes, loading the class structure from the object, locating the virtual method table from the class structure, loading an address associated with the matching virtual method table entry of the virtual call, and jumping to the loaded address. Each load can potentially cause cache misses in all levels of the cache and evict other useful data from the cache. The performance penalty of the loads and the indirect jump can add up significantly if the virtual calls are invoked often.

Figure 6:
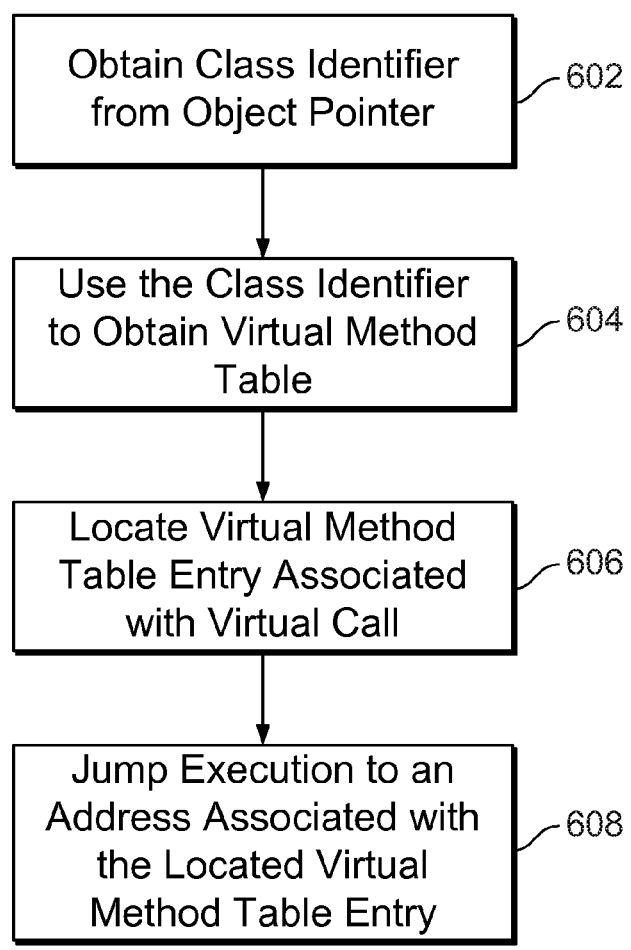
FIG. 6 is a flow chart illustrating an embodiment of a process for handling a virtual method call.

FIG. 6 is a flow chart illustrating an embodiment of a process for handling a virtual method call. At 602, a class identifier is obtained from an object pointer associated with the virtual method call. Obtaining the class identifier may include reading and/or loading the CID value to/from a register or an immediate field of an instruction. In some embodiments, obtaining the class identifier includes extracting CID bits from the object pointer. At 604, the obtained class identifier is used to obtain a virtual method table. The virtual method table may be obtained by locating an entry in a class identifier table associated with the obtained class identifier. The entry may include the desired virtual method table or a pointer to the virtual method table. In some embodiments, the entry includes an object information pointer that is used to obtain the virtual method table. At 606, a table entry in the virtual method associated with the virtual call is located. Locating the entry may include searching the table to find an address associated with a code section of the desired method call. At 606, execution is jumped to an address associated with the located virtual method table entry. The address may be a program address and/or a memory address. Jumping execution may include loading an address value into a register and performing a register jump operation. By using a class identifier (e.g. CID) stored in the header of an object pointer and a class identifier table associating the class identifier with a virtual method table, the one or more loads can be eliminated in handling virtual method calls. The virtual call directly causes only a class identifier table entry (including a virtual method table) associated with the CID bits of an object pointer needs to be loaded.

In some embodiments, "inline caches" may be used to handle virtual method calls. Using inline caches includes predicting a likely class of the object associated with a virtual call and statically jumping to a predetermined address of a code section if the class prediction is correct. The predicted class and the predetermined address may be a class and an address associated with a previous virtual call at the same virtual call site. Determining if the last prediction is correct may include comparing the class of the object associated with the virtual call with the predicted class. In some embodiments, the process of FIG. 5 is included in class comparison. The class comparison may be performed using a class identifier stored in the header of an object pointer. For example, CID bits may be extracted from an object pointer associated with a virtual call and used to compare with a class identifier value associated with the predicted class. If the values match, execution jumps to the predetermined address of a code section and if the values do not match, a virtual method table is used to indirectly jump to the correct section of code.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of determining a class of an object, including:
    obtaining a pointer of the object, where the pointer points to the object;
    extracting from the pointer one or more bits that are not implemented as address bits;
    interpreting the one or more bits as an identifier of the class of the object;
    determining the class of the object to correspond to the identifier;
    accessing information in a class structure of the class of the object without loading the object; and
    handling a virtual method call by using inline caches;
    wherein handling the virtual method call by using inline caches includes determining a prediction class that is a likely class of the object associated with the virtual method call and statically jumping execution to a determined address if the prediction class matches the class of the object;
    wherein determining the prediction class and the determined address includes using a class and an address associated with a previous virtual call;
    wherein if the prediction class is not the class of the object, using a virtual method table associated with the extracted bits to determine an address of a method associated with the virtual method call.

2. A method as recited in claim 1, wherein the pointer is a 64 bit pointer.

3. A method as recited in claim 1, wherein the number of extracted bits are less than the number of bits used to represent the class structure.

4. A method as recited in claim 1, wherein the number of extracted bits are less than the total number of bits not implemented as address bits in the pointer.

5. A method as recited in claim 1, wherein the number of bits extracted is preconfigured or dynamically configured.

6. A method as recited in claim 1, wherein the number of bits of the pointer implemented as address bits is associated with the maximum amount of memory that can physically exist on a system.

7. A method as recited in claim 1, wherein the identifier of the class of the object is associated with at least one class structure pointer.

8. A method as recited in claim 1, wherein the identifier of the class of the object uniquely identifies a class.

9. A method as recited in claim 1, wherein the identifier of the class of the object is associated with more than one class.

10. A method as recited in claim 1, wherein an entry of a table associates the identifier of the class of the object with at least a portion of class data.

11. A method as recited in claim 10, wherein the portion of the class data includes a class structure pointer associated with the object or at least a portion of data contained in the class structure associated with the object.

12. A method as recited in claim 10, wherein the portion of the class data includes a virtual method table associated with the class of the object or a pointer to a virtual method table associated with the class of the object.

13. A method as recited in claim 12, further comprising handling a virtual method call by using the bits to locate a virtual method table containing an address of a method associated with the virtual method call.

14. A method as recited in claim 1, wherein extracting includes using a mask, a bit wise operation, or a shifting operation.

15. A method as recited in claim 1, wherein interpreting the one or more bits as an identifier of the class of the object includes performing processing required to use the bits as an identifier associated with the pointer.

16. A method as recited in claim 15, wherein processing includes loading the bits into an immediate field of a processor instruction or loading the bits into a register.

17. A method as recited in claim 1, wherein determining the class of the object to correspond to the identifier includes validating the bits as a valid identifier.

18. A method as recited in claim 1, wherein determining the class of the object to correspond to the identifier includes comparing the bits to a predetermined value.

19. A method as recited in claim 18, wherein when the bits do not match the predetermined value, a class structure pointer associated with the object is obtained in determining a class associated with the pointer.

20. A method as recited in claim 1, further comprising handling a virtual method call by using the bits to locate in a virtual method table, an address of a method associated with the virtual method call.

21. A system for determining a class of an object, including:
    a processor configured to:
        obtain a pointer of the object, where the pointer points to the object;
        extract from the pointer one or more bits that are not implemented as address bits;
        interpret the one or more bits as an identifier of the class of the object,
        determine the class of the object to correspond to the identifier;

access information in a class structure of the class of the object without loading the object; and handle a virtual method call by using inline caches; and a memory element coupled to the processor includes the object;

wherein the processor is configured to handle the virtual method call by using inline caches includes determining a prediction class that is a likely class of the object associated with the virtual method call and statically jumping execution to a determined address if the prediction class matches the class of the object;

wherein the processor is configured to determine the prediction class and the determined address includes using a class and an address associated with a previous virtual call;

wherein the processor is configured to use, if the prediction class is not the class of the object, a virtual method table associated with the extracted bits to determine an address of a method associated with the virtual method call.

22. A system as recited in claim 21, wherein the memory element includes an entry of a table associates the identifier of the class of the object with at least a portion of class data.

23. A system as recited in claim 21, wherein the processor determines the class of the object to correspond to the identifier by comparing the bits to a predetermined value.

24. A system as recited in claim 21, wherein the processor is further configured to handle a virtual method call by using the bits to locate a virtual method table containing an address of a method associated with the virtual method call.

25. A system as recited in claim 21, wherein the processor is further configured handle a virtual method call by determining a prediction class and statically jumping execution to a determined address if the prediction class matches the class of the object.

26. A computer program product for determining a class of an object, the computer program product being embodied in a computer readable storage medium and comprising computer instructions for:

obtaining a pointer of the object, where the pointer points to the object;

extracting from the pointer one or more bits that are not implemented as address bits;

interpreting the one or more bits as an identifier of the class of the object; and determining the class of the object to correspond to the identifier;

accessing information in a class structure of the class of the object without loading the object and handling a virtual method call by using inline caches;

wherein handling the virtual method call by using inline caches includes determining a prediction class that is a likely class of the object associated with the virtual method call and statically jumping execution to a determined address if the prediction class matches the class of the object;

wherein determining the prediction class and the determined address includes using a class and an address associated with a previous virtual call;

wherein if the prediction class is not the class of the object, using a virtual method table associated with the extracted bits to determine an address of a method associated with the virtual method call.

* * * * *